US008321933B2

(12) United States Patent
Traenkenschuh et al.

(10) Patent No.: US 8,321,933 B2
(45) Date of Patent: Nov. 27, 2012

(54) SECURING ELECTRONIC CONTROL UNIT CODE

(75) Inventors: John L. Traenkenschuh, Mackinaw, IL (US); Paul W. Bierdeman, East Peoria, IL (US); Todd Wagner, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 1284 days.

(21) Appl. No.: 11/984,178

(22) Filed: Nov. 14, 2007

(65) Prior Publication Data

US 2009/0126028 A1 May 14, 2009

(51) Int. Cl.
*G06F 21/00* (2006.01)

(52) U.S. Cl. .......................... 726/22; 713/187; 717/123

(58) Field of Classification Search .......... 713/156–158, 713/168, 175–181, 189–194; 717/168–173; 726/10, 26–33

See application file for complete search history.

(56) References Cited

U.S. PATENT DOCUMENTS 5,337,360 A 8/1994 Fischer
6,154,844 A * 11/2000 Touboul et al. ................ 726/24
6,629,031 B2 9/2003 Gustavsson et al.
6,671,807 B1 12/2003 Jaisimha et al.
6,772,090 B2 8/2004 Hutton et al.
6,961,671 B2 11/2005 Ko
7,013,458 B2 3/2006 Bloch et al.
7,124,408 B1 10/2006 Parthasarathy
7,155,703 B2 12/2006 Meijer et al.
7,231,523 B1 * 6/2007 Mathiske ..................... 713/176
7,802,092 B1 * 9/2010 Kelly et al. .................. 713/156
2001/0032310 A1 * 10/2001 Corella ........................ 713/156
2002/0078380 A1 * 6/2002 Lin et al. ...................... 713/201
2002/0108045 A1 * 8/2002 Wells ........................... 713/182
2004/0107346 A1 * 6/2004 Goodrich et al. ............. 713/176
2005/0187674 A1 * 8/2005 Ando ............................ 701/1
2006/0041337 A1 * 2/2006 Augsburger et al. ............ 701/1
2006/0184928 A1 * 8/2006 Hughes ......................... 717/168
2007/0169079 A1 7/2007 Keller et al.
2007/0214453 A1 9/2007 Dive-Reclus
2007/0288989 A1 * 12/2007 Aarnos et al. .................... 726/1
2007/0289007 A1 12/2007 Tanaka et al.
2008/0155698 A1 * 6/2008 Round .......................... 726/26
2008/0234919 A1 * 9/2008 Ritter et al. .................. 701/114
2009/0006860 A1 * 1/2009 Ross ............................ 713/189
2009/0125985 A1 5/2009 Traenkenschuh et al.

OTHER PUBLICATIONS

Open Mobile Alliance OMA-TS-DRM-DRM-V2_0-20060303-A "DRM Specification Approved Version 2.0-03," Mar. 2006 (142 pages).
Office Action in copending U.S. Appl. No. 11/984,144 dated Dec. 27, 2010 (7 pages).
Office Action issued in U.S. Appl. No. 11/984,144, dated Jun. 28, 2011 (8 pages).

* cited by examiner

*Primary Examiner* — Gilberto Barron, Jr.
*Assistant Examiner* — Malcolm Cribbs
(74) *Attorney, Agent, or Firm* — Finnegan, Henderson, Farabow, Garrett & Dunner LLP

(57) ABSTRACT

Methods and systems are provided for securing electronic control unit code. In one implementation, a method is provided. According to the method, an order for the program code may be transmitted to a developer. The order may include specifications and an authentication key. The method may further include receiving the program code and the authentication certification from the developer and verifying the authentication certificate to determine whether the developer was an authorized source of the program code. The method may generate metadata identifying the authorized source of the program code and embed the metadata in the program code.

20 Claims, 4 Drawing Sheets

300

SECURING ELECTRONIC CONTROL UNIT CODE

RELATED APPLICATION

This disclosure is related to U.S. application Ser. No. 11/984,144, entitled "Verifying Electronic Control Unit Code," filed on even date.

TECHNICAL FIELD

The present disclosure relates generally to computerized methods and systems, and more particularly, to methods and systems for securing electronic control unit code.

BACKGROUND

A machine (e.g., a fixed or mobile commercial machine, such as a construction machine, fixed engine system, marine-based machine, etc.) may include an electronic control unit (ECU). An ECU may control one or more subsystems of a machine. For example, one type of ECU is an engine control module (ECM), which may control operations of a machine's engine. For example, an ECM may control the quantity of fuel that is injected into each cylinder per engine cycle, ignition timing, variable valve timing, and operations of other engine components. Accordingly, the ECM controls or dictates the parameters by which the engine may operate. Similarly, other ECUs may control other subsystems of a machine, such as ECUs for controlling operation of a machine's transmission or anti-locking brake system. These ECU controls are implemented through software instructions.

The software instructions for an ECU may be updated throughout the operating life of a machine. Updates to ECU software instructions may be made for a variety of reasons. For example, an update may provide new functionality and/or modifications to a machine's ECU software in order to adapt it to different environmental conditions or performance expectations. However, when a machine's ECU is loaded with updated ECU code, machines typically do not provide security measures to determine whether the ECU code is authentic (e.g., that the ECU code is authorized by the manufacturer of the machine).

As a result of the foregoing, updating ECU code poses several possible uncertainties. For example, the source of the code is typically indeterminable and, accordingly, the machine cannot determine whether the updated ECU code is authorized. For example, the code may originate from an unauthorized party. As another example, an unauthorized party may have modified legitimate ECU code to include unauthorized modifications. In particular, the machine may not provide functionality for determining whether the updated ECU code contains any malware (e.g., a virus, worm, trojan horse, etc.) that may cause the ECU code to operate in an unpredictable or compromised manner.

Unauthorized and/or unauthorized modification to ECU code presents several problems and challenges. ECU code that originates from an unauthorized party or that has been modified by an unauthorized party might cause overuse of a machine component, such as the engine and, accordingly, early engine failure much sooner than expected if the machine operated within expected parameters. For example, a machine's engine may not last as long as expected and, as a result, a warranty may expire earlier than anticipated. Furthermore, machine warranties may be inadvertently voided by machine owners that load unauthorized ECU code or ECU code including unauthorized modifications. As another example, an engine may unexpectedly lose power or automated control systems may malfunction due to unauthorized and/or modified ECU code.

U.S. Pat. No. 7,013,458 B2 (the '458 patent) to Bloch et al. discloses a method and apparatus for associating metadata attributes with program elements. According to the '458 patent, source code contains syntactic elements that specify metadata attributes for program elements and the system incorporates the metadata attributes into object code for a program. However, the '458 patent does not disclose a method or system for securing ECU code. Furthermore, the '458 patent does not disclose a method or system for verifying, when ECU code is installed, whether the ECU code is authentic.

Disclosed embodiments are directed to overcoming one or more of the problems set forth above.

SUMMARY

In one aspect, the present disclosure is directed to a method for securing program code. The method may transmit an order for the program code to a developer. The order may include specifications and an authentication key. The method may further receiving the program code and the authentication certification from the developer and verifying the authentication certificate to determine whether the developer was an authorized source of the program code. The method may generate metadata identifying the authorized source of the program code and embed the metadata in the program code.

In another aspect, the present disclosure is directed to system for securing program code for an electronic control unit. The system may comprise a server. The server may be adapted to transmit an order for the program code to a developer. The order may include specifications and an authentication key. The server may further receive the program code and the authentication certification from the developer and verify the authentication certificate to determine whether the developer was an authorized source of the program code. The server may generate metadata identifying the authorized source of the program code and embed the metadata in the program code.

It is to be understood that both the foregoing general description and the following detailed description are exemplary and explanatory only and are not restrictive of embodiments, as claimed.

BRIEF DESCRIPTION OF THE DRAWINGS

The accompanying drawings, which are incorporated in and constitute a part of this disclosure, illustrate various embodiments. In the drawings.

DETAILED DESCRIPTION

Reference will now be made in detail to the following exemplary embodiments, which are illustrated in the accompanying drawings. Wherever possible, the same reference numbers will be used throughout the drawings to refer to the same or like parts.

Figure 1:
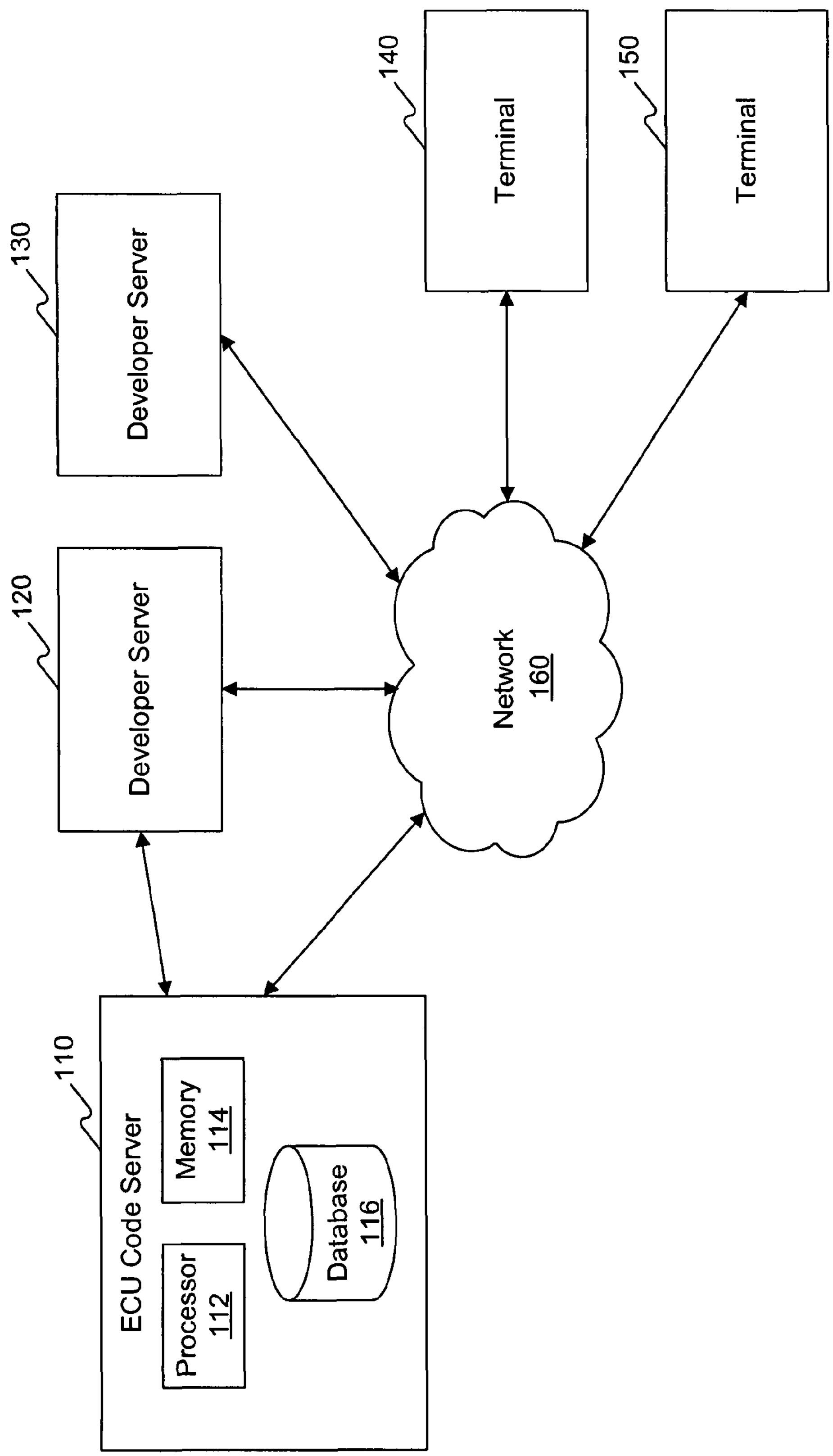
FIG. 1 is an example of a system for securing ECU code.

FIG. 1 is an example of a system 100 for securing electronic control unit (ECU) code. In particular, system 100 may provide functionality for receiving, authenticating, and securing software updates for ECU code that are received from one or more systems. As shown in system 100, ECU code server 110, developer servers 120-130 and terminals 140-150 are connected to a network 160. One of skill in the art will appreciate that although one ECU code server, two developer servers, and three terminals are depicted in FIG. 1, any number of these entities may be provided. Furthermore, one of ordinary skill in the art will recognize that functions provided by one or more entities of system 100 may be combined.

Network 160 provides communications between the various entities in system 100, such as EMC code server 110, developer servers 120-130, and terminals 140-150. In addition, ECU code server 110, developer servers 120-130, and terminals 140-150 may access legacy systems (not shown) via network 160, or may directly access legacy systems, databases, or other network applications. Network 160 may be a shared, public, or private network, may encompass a wide area or local area, and may be implemented through any suitable combination of wired and/or wireless communication networks. Furthermore, network 160 may comprise a local area network (LAN), a wide area network (WAN), an intranet, or the Internet.

ECU code server 110 may comprise a general purpose computer (e.g., a personal computer, network computer, server, or mainframe computer) having a processor 112 that may be selectively activated or reconfigured by a computer program. ECU code server 110 may also be implemented in a distributed network. For example, ECU code server 110 may communicate via network 160 with one or more additional servers (not shown), which may enable ECU code server 110 to distribute a process for parallel execution. Alternatively, ECU code server 110 may be specially constructed for carrying-out methods consistent with disclosed embodiments.

ECU code server 110 may further include a memory 114 for storing program modules that, when executed by processor 112, perform one or more processes for receiving and authenticating software updates for ECU code. Memory 114 may be one or more memory devices that store data as well as software. Memory 114 may also comprise one or more of RAM, ROM, magnetic storage, or optical storage, for example.

In implementations of disclosed embodiments, ECU code server 110 may send orders for software and/or software updates to one or more external servers. For example, ECU code server 110 may transmit a purchase order for a software project. The purchase order may include design specifications for a developer, including functionality requirements and/or other parameters (e.g., parameters for complying with memory allocation requirements, whether the program is within operating parameters of a machine). The purchase order may include an authentication certificate, which is provided to the developer in order to verify the developer's identity. For example, when the developer completes the software project, the developer may transmit the completed software back to ECU code server 110 with the authentication certificate.

Accordingly, ECU code server 110 may receive data, such as software updates and authentication certificates, from one or more systems and store the received data in database 116. Furthermore, ECU code server 110 may check for software updates for ECU code on a periodic basis, such as hourly, daily, weekly, monthly, etc. For example, an administrator of ECU code server 110 may cause ECU code server 110 to check for updates at desired intervals. The software updates may include ECU code that was revised, updated, modified, or newly created.

When ECU code server 110 receives a software update and authentication certificate, ECU code server 110 may use the authentication certificate to validate the source of the software update. For example, ECU code server 110 may confirm that the software update was sent to ECU code server 110 by the expected developer based upon confirming the authentication certificate. Furthermore, ECU code server 110 may compare the software to the purchase order requirements in order to determine whether the delivered software meets the requirements. For example, ECU code server 110 may determine whether the software meets memory allocation requirements and/or other design requirements.

ECU code server 110 may further provide functionality for preserving the security of ECU code for distribution. For example, ECU code server 110 may protect the security of ECU code by "sealing" the ECU code with embedded metadata. The embedded metadata may identify individuals and/or organizations that have modified the code, identify dates and/or times of modification, and/or provide a modification history. The metadata may be accessed and used to prevent unauthorized changes and/or actions that may, for example, violate warranties. ECU code server 110 may further implement encryption and password security protocols to prevent unauthorized modifications and/or check for actions that may violate or void warranty policies. The metadata may further identify industry specific properties of the program code, such as an identification of a machine component or a machine operating parameter. Still further, the metadata may describe or identify components that the ECU code operates, controls, or has interactions with. For example, the metadata may specify that a machine component is newly installed or may describe other aspects of machine components, such as part numbers, installation histories, and/or operating histories.

ECU code server 110 may also provide functionality for examining ECU code for unauthorized modifications through inspection of the metadata. For example, in one embodiment, ECU code server 110 system may, prior to loading ECU code onto an ECU (discussed in further detail in connection with FIG. 2), verify the authenticity of the ECU code by examining the embedded metadata. Such regulation of ECU code may prevent hacking and facilitate and track changes and additions to software that may be flashed onto an ECU. Furthermore, other components, such as hardware devices (discuss below in connection with FIG. 2 in more detail) for loading ECU code to machines may provide functionality for verifying ECU code.

ECU code server 110 may implement, for example, digital signatures to verify the authenticity of ECU code. Digital signatures may simulate a signature in digital form. Digital signature processes typically use two algorithms. One algorithm is used to "sign" a user's secret or private key. The other algorithm is used to verify the signature and involves the user's public key. The output of the signature process is called the "digital signature." Digital signatures may authenticate associated input, typically referred to as "message." Messages may include any form of communication or information, such as, for example, software for ECU code.

Furthermore, ECU code server 110 may store in database 116 data representing authorized users and/or version histories tracking changes to and additions to ECU. For example, database 116 may store in data tables such information after receiving and authenticating ECU code that is received over network 160 from, for example, developer servers 120-130.

Database 116 may store and track the status of software. For example, when software and/or a source of software is identified as unauthorized (i.e., it originated from or was modified by an authorized source), database 116 may store an appropriate status (e.g., "revoked") for such software. Code that has been revoked may be removed from ECUs that are in communication with ECU code server 110 over network 160. For example, revocation may occur at the next service event. Furthermore, during install of code to an ECU, in some embodiments, the ECU may be in communication with ECU code server 110 via network 160. Accordingly, ECU code server 110 may verify whether the code that is to be loaded has a revoked status. If ECU code server 110 determines that the code to be loaded is revoked, ECU code server 110 may prevent installation from proceeding.

Code may be revoked on a variety of levels. For example, the code itself may have a "revoked" status, as discussed above. Alternatively, or in addition, code from a particular source (e.g., an individual or organization) may be revoked. That is, code from a particular organization may be deemed compromised and, accordingly, any code from that organization will be classified in database 116 as being "revoked." For example, ECU code server 110 may transmit a message to code loading hardware (discussed below) indicating that a developer has a revoked status, the program code has a revoked status, or all code associated with an employee number has a revoked status. Accordingly, database 116 may facilitate tracking of comprised code and/or its source. Database 116 may also store other statuses of code, such as "suspect" for code that is deemed to possibly have been comprised.

Developer servers 120-130 may comprise general purpose computers (e.g., a personal computer, network computer, server, or mainframe computer) and include databases (not shown) for storing data, such as software updates for ECU code. For example, developer servers 120-130 may store updates for ECU software developed internally by a manufacturer of a machine and/or by authorized external parties. Developer servers 120-130 may receive purchase orders including specifications and authentication certificate from ECU code server 110. For example, developer server 120 may receive a purchase order including specifications and an authentication certificate and, once the code has been prepared according to specifications, transmit the code to ECU server 110 with the authentication certificate.

Terminals 140-150 may be any type device for communicating with ECU code server 110 and/or developer servers 120-130 over network 160. For example, terminals 140-150 may be personal computers, handheld devices, or any other appropriate computing platform or device capable of exchanging data with network 160. Terminals 140-150 may each include a processor and a memory (not shown), for example. Further, terminals 140-150 may execute program modules that provide one or more graphical user interfaces (GUIs) for interacting with network resources, such as ECU code server 110 and/or developer servers 120-130.

Users may access ECU code server 110 over network 160 through a web browser or software application running on any one of terminals 140-150. For example, a web portal may include options for allowing a user, such as an administrator, to log onto a secure site provided by ECU code server 110 by supplying credentials, such as a username and a password. Once logged onto the site, the web portal may display a series of screens prompting the user to make various selections to transmit updated ECU code to ECU code server 110. For example, a user may transmit code and an authentication certificate to ECU code server 110. Further, this functionality may be implemented in a secure fashion using an HTTPS (hypertext transfer protocol secure) environment to transfer data over network 160.

Figure 2:
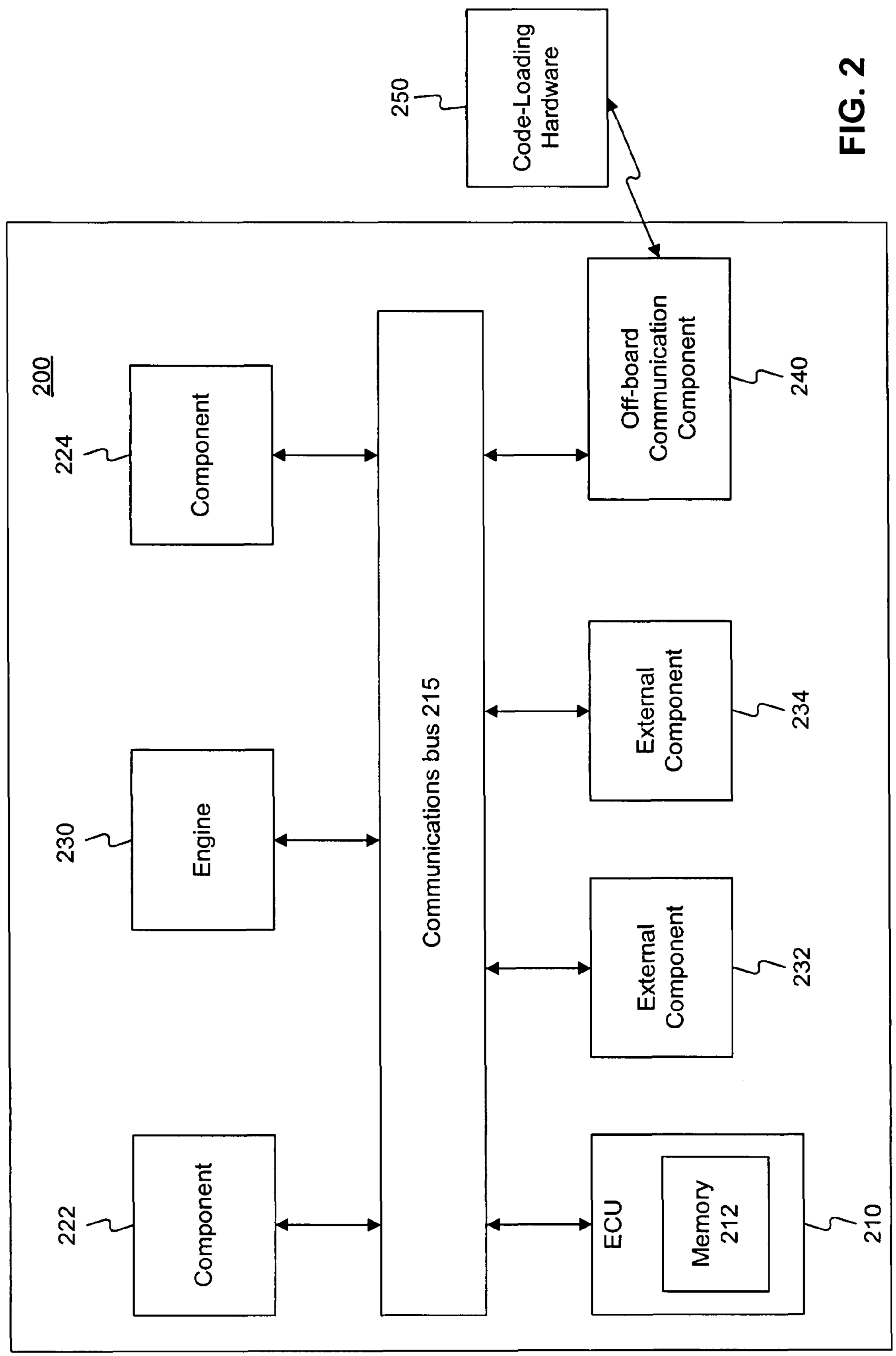
FIG. 2 is an exemplary system for a machine and related components.

FIG. 2 is an exemplary system 200 for a machine and related components, consistent with a disclosed embodiment. Examples of mobile machines include commercial machines, such as trucks, cranes, earth moving machines, mining machines, backhoes, material handling equipment, farming equipment, marine vessels, aircraft, and any type of movable machine.

System 200 may include an electronic control unit (ECU) 210, which controls operations of a machine component, such as engine 230. Alternatively, ECU 210 may control operations of any one or more of components 222-224 and/or external components 232-234 via communications bus 215. Furthermore, ECU 210 may communicate with off-board communications component 240 via communications bus 215. Although FIG. 2 depicts two components 222-224, two external components 232-234, and one off-board communications component 240, one of ordinary skill in the art will appreciate that the number of components shown in FIG. 2 is illustrative and additional components may be included in system 100.

Engine 230 may be any appropriate type of engine for operating a machine. For example, engine 220 may be a diesel, gasoline, or natural gas driven internal combustion engine, or may use fuels such as ethanol, methanol, or other distilled alcohols. Alternatively, engine 220 may be an electrical generation power engine using any of a variety of fuels.

ECU 210 may include one or more hardware and/or software components for controlling and/or monitoring operations of an machine component, such as engine 220. For example, ECU 210 may include a processor (not shown) and a memory 212 storing software for regulating and/or controlling engine operations. Furthermore, ECU 210 may communicate with one or more of components 222-224 that control other operations. Components 222-224 may comprise any combination of hardware, sensors, controllers, and/or software. For example, component 222 may include a temperature control software module for determining and regulating engine temperature and engine component 224 may include an oil pressure control software module for determining and regulating oil pressure. Other components may manage or monitor engine parameters, such as RPM, temperature, speed, etc. Still further, for example, one of components 222-224 may control a machine's transmission.

External components 232-234 may control operations of a machine attachment, such as a blade. ECU 210 may communicate with one or more external components 232-234 and may comprise any combination of hardware, sensors controllers, and/or software modules. For example, external components 232-234 may be systems that require engine state information, but are not directly related to engine operations (e.g., other on-board machine systems, such as systems for controlling machine attachments or operator display systems, for example).

ECU 210 may communicate with off-board systems using off-board communications component 240. Off-board communications component 240 may format state information into any appropriate format, as needed, for transmission to off-board systems. Transmission to off-board systems may be accomplished wirelessly over an antenna (not shown), for example. Wireless communications may include satellite, cellular, infrared, and any other type of wireless communication. Alternatively, off-board communications component 240 may directly interface with an off-board system through a data port (not shown), such as an Ethernet port or via a wireless communication protocol (e.g., Bluetooth). For example, an Ethernet port may deliver a message to an external device (e.g., code-loading hardware 250) that is connected to the data port. The external device may then transmit the response over one of many different networks (e.g., cellular, satellite, 802.11, etc.).

ECU 210 may communicate with components 222-224 and external components 232-234 via communications bus 215. ECU 210 may also receive data from and transmit data to off-board systems using off-board communications component 240, which is available over communications bus 215. Communications bus 215 may be proprietary or non-proprietary, and may include manufacturer-based data links and communication paths based on known industry standards (e.g., J1939, RS232, RP 1210, RS-422, RS-485, MODBUS, CAN, etc.). In operation, ECU 210 manages or controls an operating state of engine 220, including controlling starting and shutdown sequences for starting and shutting down motors.

Code-loading hardware 250 is external to system 200 and provides a mechanism for loading ECU code to engine 230. Code-loading hardware 250 may constitute any device for loading ECU code and may implement routines through a combination of hardware and software. For example, code-loading hardware 250 may inspect metadata and/or digital signatures and, in particular, may determine whether ECU code has been revoked, tampered with, corrupted, or whether an operator is authorized to load the ECU code. For example, if code-loading hardware 250 determines that ECU code has a status of "revoked," the installation of that code may not proceed. Furthermore, code-loading hardware 250, in some embodiments, may be in communication with ECU code server 110 during installation via network 160, either wireless or via a wired data link. Accordingly, in such embodiments, code-loading hardware 250 may transmit data identifying ECU code to ECU code server 110, which may then compare properties of the ECU code to data stored in database 116. If the code, developer, and/or organization related to the code is determined to have a "revoked" status, then ECU code server 110 may transmit a message to code-loading hardware 250. That message may instruct code-loading hardware 250 to not load the code to ECU 210. Furthermore, ECU 210 may, at a later time, determine that installed program code has been revoked and transmit an appropriate message to off-board communication component 240. Off-board communication component 240 may then disable or update the program code.

Code-loading hardware 250 may comprise an input device (keypad, touch screen, voice recognition functionality) to authenticate a user that is attempting to load ECU code to a machine. In addition to or instead of verifying the status of ECU code by communicating with ECU code server 110, prior to loading any ECU code to a machine, code-loading hardware may authenticate the ECU code by, for example, examining and authenticating a digital signature included in metadata embedded in the ECU code. Moreover, code-loading hardware 250 may store data pertaining to revoked code, which may be updated on a period basis when code-loading hardware 250 is connected to network 160 and can communicate with ECU code server 110.

Furthermore, ECU 210 may determine whether or not code-loading hardware 250 is authentic. For example, code-loading hardware 250 may communicate via a data link or wirelessly with off-board communication component 240. Furthermore, code-loading hardware 250 may be omitted in embodiments wherein code is received directly via off-board communication component 240 via, for example, an antenna. Accordingly, in such implementations, processes performed by code-loading hardware may be performed by off-board communication component 240.

Figure 3:
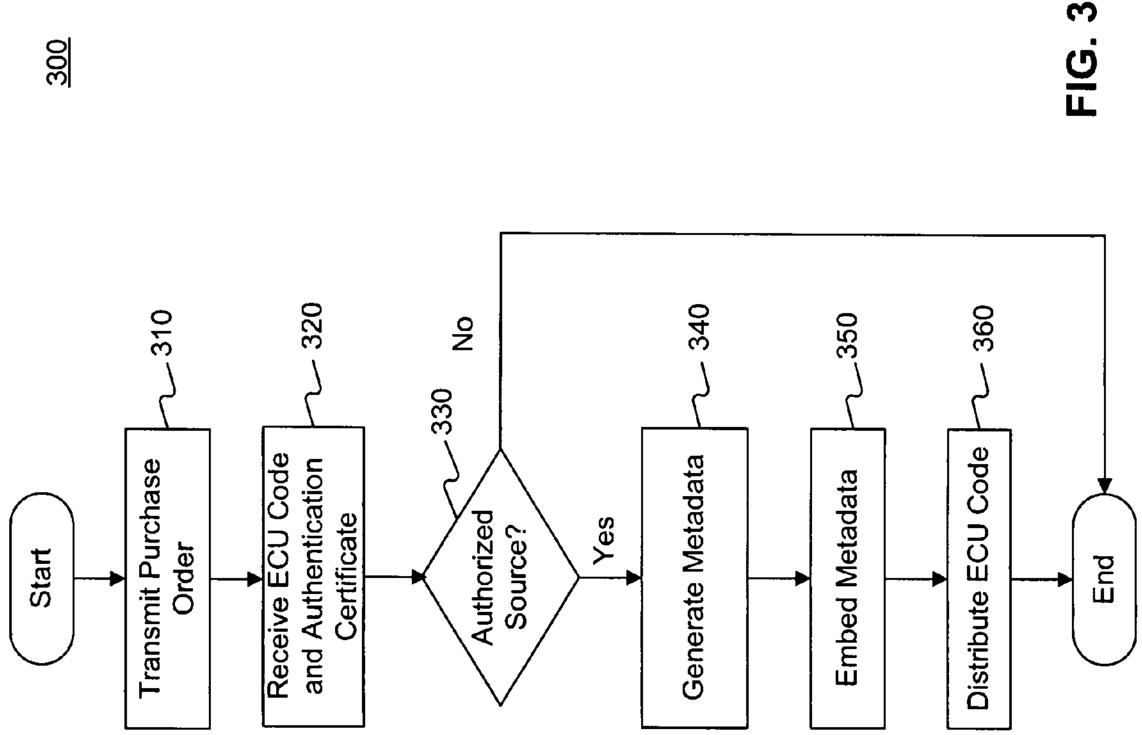
FIG. 3 is a flow diagram of an example of a method for securing ECU code.

Referring now to FIG. 3, a flow diagram 300 is provided of an example of a method for securing ECU code. The method may implement one or more processes according to program instructions stored in memory 114 of ECU code server 110 and executed by processor 112.

At the start of the process, in step 310, ECU code server 110 may send a purchase order for software and/or software updates to an external server. The purchase order may include design specifications for a developer, including functionality requirements and/or other parameters (e.g., parameters for complying with memory allocation requirements). The purchase order may include an authentication certificate, which is provided to the developer in order to verify the developer's identity.

In step 320, ECU code server 110 may receive ECU code and an authentication certificate. For example, ECU code server 110 may receive the ECU code and authentication certificate over network 160 from one or more of developer servers 120-130 and/or terminals 140-150. ECU code server 110 may check for software updates for ECU code on a periodic basis (e.g., hourly, daily, weekly, monthly, etc). Alternatively, or in addition, an administrator of ECU code server 110 may cause ECU code server 110 to check for updates at desired intervals. Software updates may originate from one source or from multiple sources in the event that packaged updates are provided from one or more sources. ECU code server 110 may store the received ECU code and authentication certificate in database 116.

Next, in step 330, ECU code server 110 may evaluate whether the received ECU code originated from and/or was transmitted from an authorized source. Such evaluation techniques may include inspecting metadata and/or the authentication certificate (e.g., verifying a digital signature) included with the received ECU code. If the ECU code originates from or was transmitted from an authorized source, then the process proceeds to step 340. Otherwise, the process ends.

In step 340, once authenticated, ECU code server 110 may generate metadata for the received ECU code. For example, ECU code server 110 may examine metadata included with the ECU code to access information describing the ECU code's history and/or properties. ECU code server 110 may then generate appropriate metadata. For example, the metadata may identify individuals that have modified the code, identify dates and/or times of modification, and/or provide a modification history. The metadata may further identify industry specific properties of the program code, such as an identification of a machine component or a machine operating parameter.

In step 350, ECU code server 110 may embed the generated metadata in the ECU code in order to "seal" the ECU code. These "seals" may include approvals of the code supplier, which may indicate that the code was verifying by the supplier for functionality requirements as well as to indicate that the code was created by an authorized source. ECU code server 110 may then store the ECU code with the embedded metadata in database 116. The metadata may comprise a digital signature and/or additional data, as discussed above.

In step 360, ECU code server 110 may then distribute the ECU code. For example, ECU code may be distributed via network 160 to any number of machines directly or indirectly. Indirectly, ECU code server 110 may distribute the ECU code to terminals 140-150 from which it may be loaded to code-loading device (e.g., code-loading hardware 250). Directly, ECU code server 110 may distribute the ECU code to network 160, where it may be accessed by a machine (e.g., via off-board communication component 240).

As one of ordinary skill in the art will appreciate, one or more of steps 310-360 may be optional and may be omitted from implementations in certain embodiments.

Figure 4:
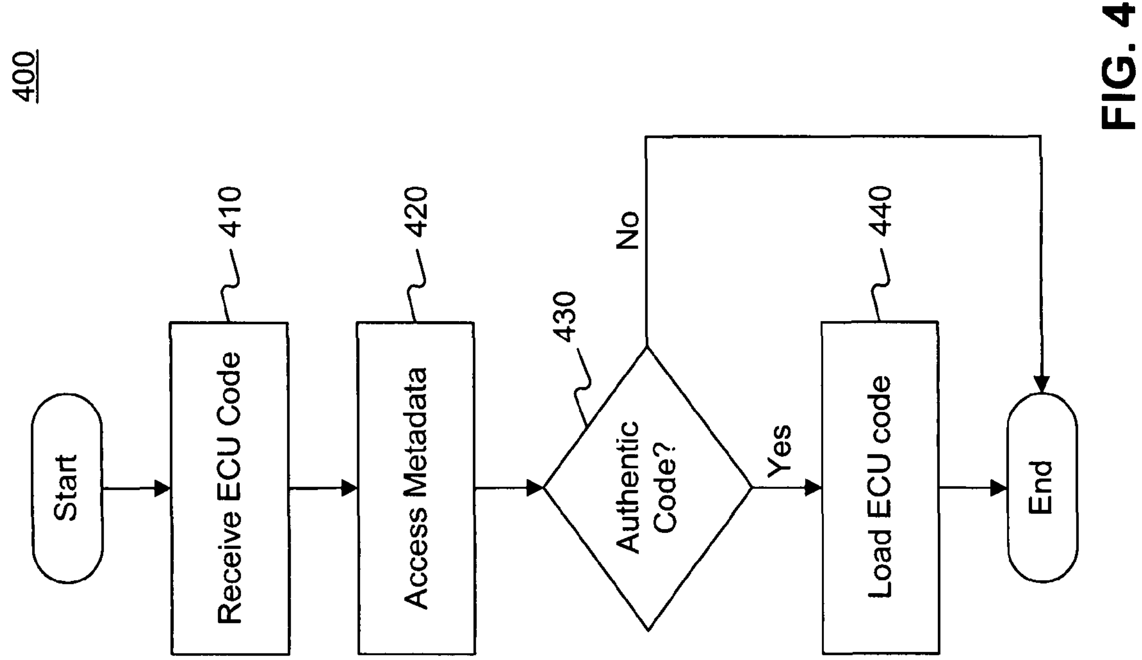
FIG. 4 is a flow diagram of an example of a method for verifying the authenticity of ECU code.

Referring now to FIG. 4, a flow diagram 400 is provided of an example of a method for verifying the authenticity of ECU code. For example, the method may implement one or more processes according to program instructions stored in memory 114 and executed by processor 112.

At the start of the process, in step 410, code-loading hardware 250 may receive ECU code. Alternatively, in step 410, off-board communication component 240 may directly receive ECU code via, for example, an antenna.

Next, in step 420, code-loading hardware 250 and/or off-board communication component 240 may access the metadata stored in the received ECU code. For example, code-loading hardware 250 and/or off-board communication component 240 may implement processes for extracting the metadata for inspection. As discussed above, metadata may describe the ECU code's history and/or properties, such as providing an identification of individuals that have modified the code, identification of dates of modification, and/or a modification history. Furthermore, the metadata may include a digital signature.

In step 430, code-loading hardware 250 and/or off-board communication component 240 may determine whether the received ECU code is authentic by evaluating the metadata and/or digital signature. For example, code-loading hardware 250 and/or off-board communication component 240 may authenticate a digital signature included with the ECU code to verify authenticity. In some embodiments, in addition to, or instead of, authenticating the digital signature by code-loading hardware 250, code-loading hardware 250 may maintain data identifying revoked code or may communication via network 160 with ECU code server 110 to determine the status of code prior to its installation.

For example, code-loading hardware 250 may communicate with ECU code server 110 via network 160 to verify whether the code that is to be loaded has a revoked status. If ECU code server 110 determines that the code to be loaded is revoked, ECU code server 110 may prevent installation from proceeding. Alternatively, or in addition, code from a particular source (e.g., an individual or organization) may have a revoked status and, accordingly, ECU code server 110 may transmit an appropriate message to code-loading hardware 250 to prevent installation. If the received ECU code is determined in step 430 to be authentic and/or having an appropriate status (e.g., not revoked), then the process proceeds to step 440. Otherwise, the process ends.

In step 440, code-loading hardware 250 may transfer the ECU code to off-board communication component 240, which may then transmit the ECU code via communications bus 215 to ECU 210. ECU 210 may then store the ECU code in memory 212 and/or perform any required installation procedures. Alternatively, in an implementation where off-board communication component 240 directly received the ECU code, in step 440, after authentication, off-board communication component 240 may transfer the ECU code via communications bus 215 to ECU 210. The process then ends.

As one of ordinary skill in the art will appreciate, one or more of steps 410-440 may be optional and may be omitted from implementations in certain embodiments.

INDUSTRIAL APPLICABILITY

Disclosed embodiments may provide methods and systems for providing secure ECU code and verifying, when ECU code is installed, whether the ECU code is authentic. For example, disclosed embodiments may protect the security of ECU code by "sealing" the ECU code with embedded metadata. The embedded metadata may identify individuals and/or organizations that have modified the code, identify dates and/or times of modification, and/or provide a modification history. The metadata may be accessed and used to prevent unauthorized changes and/or actions that may, for example, violate warranties. Furthermore, the metadata may include a digital signature.

Furthermore, in other disclosed implementations, the authenticity of ECU code may be verified by examining embedded metadata. Such regulation of ECU code may prevent hacking and facilitate and track changes and additions to software that may be flashed onto an ECU. ECU code server 110 may implement hashing techniques and digital signatures to verify the authenticity of ECU code. The authenticity of ECU code may be determined by code-loading devices and/or by components of a machine that receive ECU code. The code-loading devices and/or machine components may be in communication with a server over a network in order to determine whether code has been revoked.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods may be implemented as a combination of hardware and software or in hardware alone. Examples of hardware include computing or processing systems, including personal computers, servers, laptops, mainframes, microprocessors and the like. Additionally, although aspects are described as being stored in memory, one skilled in the art will appreciate that these aspects can also be stored on other types of computer-readable media, such as secondary storage devices, for example, hard disks, floppy disks, or CD-ROM, the Internet or other propagation medium, other forms of RAM or ROM, USB media, DVD, or other optical drive media. Computer programs based on the written description and methods for implementing disclosed embodiments are within the skill of an experienced developer. The various programs or program modules can be created using any of the techniques known to one skilled in the art or can be designed in connection with existing software. For example, program sections or program modules can be designed in or by means of Net Framework, .Net Compact Framework (and related languages, such as Visual Basic, C, etc.), Java, C++, HTML, HTML/AJAX combinations, XML, or HTML with included Java applets. One or more of such software sections or modules can be integrated into a computer system or browser software.

Moreover, while illustrative embodiments have been described herein, the disclosure includes any and all embodiments having equivalent elements, modifications, omissions, combinations (e.g., of aspects across various embodiments), adaptations and/or alterations as would be appreciated by those in the art based on the present disclosure. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope of equivalents.

What is claimed is:

1. A method for securing program code for an electronic control unit, comprising:

transmitting an order for the program code to a developer, the order including specifications and an authentication certificate and requesting the developer to develop the program code based on the specifications;

after the program code is developed by the developer, receiving the developed program code and a digital signature from the developer;

verifying the digital signature to determine whether the developer was an authorized source of the developed program code;

generating metadata identifying the authorized source of the developed program code;

embedding the metadata in the developed program code; and verifying the developed program code to determine whether the developed program code is within the specifications of the order, wherein determining whether the developed program code is within the specifications of the order includes checking memory allocation parameters of the developed program code.

2. The method of claim 1, wherein determining whether the developed program code is within the specifications of the order further includes checking whether the developed program code is within operating parameters of a machine.

3. The method of claim 1, further comprising:

transmitting a message indicating that the developer has a revoked status.

4. The method of claim 1, further comprising:

transmitting a message indicating that the developed program code has a revoked status.

5. The method of claim 1, further comprising:

transmitting a message indicating that all program code associated with an employee number has a revoked status.

6. The method of claim 1, further comprising generating metadata identifying industry specific properties of the developed program code.

7. The method of claim 6, wherein the industry specific properties of the developed program code include an identification of a machine component.

8. The method of claim 6, wherein the industry specific properties of the developed program code include an identification of a machine operating parameter.

9. A system for securing program code for an electronic control unit, comprising:

a server, the server adapted to:

transmit an order for the program code to a developer, the order including specifications and an authentication certificate and requesting the developer to develop the program code based on the specifications;

after the program code is developed by the developer, receive the developed program code and a digital signature from the developer;

verify the digital signature to determine whether the developer was an authorized source of the developed program code; and when the developer is verified as an authorized source of the developed program code:

generate metadata identifying the authorized source of the developed program code;

embed the metadata in the developed program code; and make the developed program code with the embedded metadata available for distribution over an electronic network; and transmit a message indicating at least one of that the developer has a revoked status, that the developed program code has a revoked status, or that all program code associated with an employee number has a revoked status.

10. The system of claim 9, the server further adapted to:

verify the developed program code to determine whether the developed program code is within the specifications of the order.

11. The system of claim 10, wherein determining whether the developed program code is within the specifications of the order includes checking memory allocation parameters of the developed program code.

12. The system of claim 10, wherein determining whether the developed program code is within the specifications of the order includes checking whether the developed program code is within operating parameters of a machine.

13. The system of claim 9, the server further adapted to:

generate metadata identifying industry specific properties of the developed program code.

14. The system of claim 13, wherein the industry specific properties of the developed program code include an identification of a machine component.

15. The system of claim 13, wherein the industry specific properties of the developed program code include an identification of a machine operating parameter.

16. A method for securing program code for an electronic control unit, comprising:

transmitting an order for the program code to a developer, the order including specifications and an authentication certificate and requesting the developer to develop the program code based on the specifications;

after the program code is developed by the developer, receiving the developed program code and a digital signature from the developer;

verifying the digital signature to determine whether the developer was an authorized source of the developed program code;

when the developer is verified as an authorized source of the developed program code:

generating first metadata identifying the authorized source of the developed program code;

generate second metadata identifying industry specific properties of the developed program code, wherein the industry specific properties of the developed program code include at least one of an identification of a machine component or an identification of a machine operating parameter;

embedding the first and second metadata in the developed program code; and distributing, over an electronic network, the developed program code with the embedded metadata to one or more terminals for loading to the electronic control units of one or more machines.

17. The method of claim 16, further comprising verifying the developed program code to determine whether the developed program code is within the specifications of the order.

18. The method of claim 17, wherein determining whether the developed program code is within the specifications of the order includes checking memory allocation parameters of the developed program code.

19. The system of claim 10, wherein determining whether the developed program code is within the specifications of the order includes checking whether the developed program code is within operating parameters of a machine.

20. The method of claim 16, further comprising transmitting a message indicating at least one of that the developer has a revoked status, that the developed program code has a revoked status, or that all program code associated with an employee number has a revoked status.

* * * * *